G. E. MAY.
WATER JACKETED OVEN.
APPLICATION FILED NOV. 9, 1912.
1,097,814.
Patented May 26, 1914.
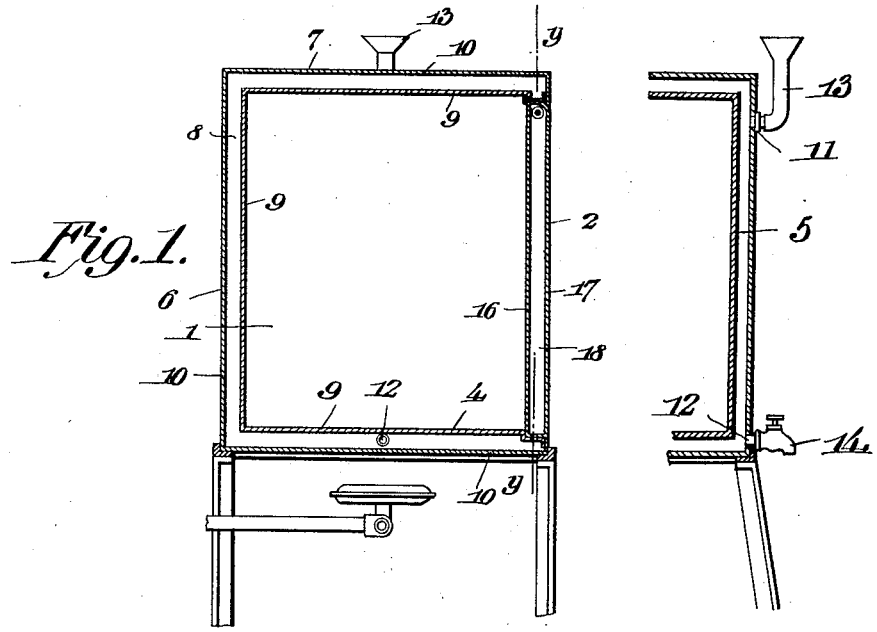
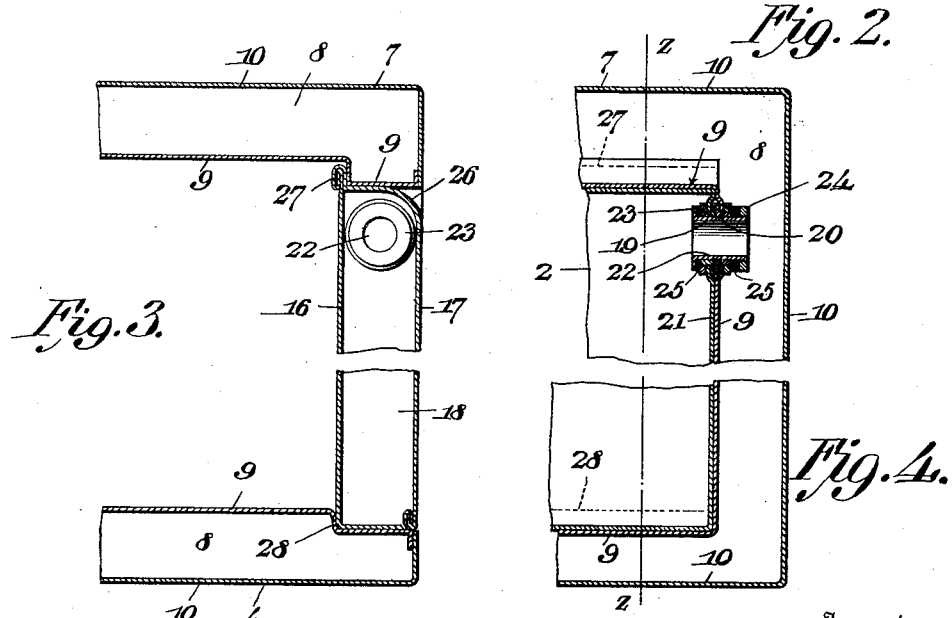
Witnesses
D. B. Galt.
H. S. Austin
Inventor
George E. May.
By Joshua R. H. Potts
Attorney

UNITED STATES PATENT OFFICE.

GEORGE EDWARD MAY, OF MARSHFIELD, VERMONT.

WATER-JACKETED OVEN.

1,097,814.     Specification of Letters Patent.     Patented May 26, 1914.

Application filed November 9, 1912. Serial No. 730,330.

*To all whom it may concern:*

Be it known that I, GEORGE E. MAY, a citizen of the United States, residing at Marshfield, county of Washington, and State of Vermont, have invented certain new and useful Improvements in Water-Jacketed Ovens, of which the following is a specification.

My invention relates to ovens and particularly to bake ovens especially adapted for domestic use.

The object of my invention is to provide an improved oven of the class mentioned in which an even heat may be readily maintained and in which burning of the food therein is practically impossible.

A further object of my invention is to provide an oven characterized as stated which shall also constitute a water heater.

A further object of my invention is to provide an oven of the class mentioned which shall be portable, to the end that the same may be arranged upon a stove, open fire or other convenient place for heating or with which an oil or gas burner may be employed to supply the necessary heat.

Other objects will appear hereinafter.

With these objects in view my invention consists generally in a chamber open at the front, and provided with a closure, the bottom, top, sides and back being double-walled to form a water jacket. Suitable means are provided for filling the jacket space and for drawing off the water therefrom when desired.

My invention further consists in an oven formed as above mentioned in which the front closure or door is double walled forming a water space and a hinge mounting for the door constituting a communication for the water between the door portion and the jacket space.

My invention further consists in various details in construction and arrangement of parts all of which will be fully described hereinafter and particularly pointed out in the claim.

My invention will be more readily understood by reference to the accompanying drawings forming a part of this specification and in which—

Figure 1 is a vertical section through an oven embodying my invention in its preferred form, illustrating the oven resting upon a skeleton frame or support and a fluid burner arranged beneath the same, Fig. 2 is a partial detail sectional view of the oven illustrating the arrangement of the water induction and eduction means, Fig. 3 is a detail vertical section on the line z—z of Fig. 4, and Fig. 4 is a detail section on the line y—y of Fig. 1.

Referring now to the drawings the oven consists of a preferably rectangular chamber 1 open at the front and provided with a suitable door or closure 2. The bottom 4, ends 5, back 6 and top 7 are each formed with a double-wall forming a jacket space 8 adapted to contain water when the device is in use, 9 indicating the inner walls and 10 the outer walls. Nipples 11 and 12 are secured to one of the outer walls 10 and communicate with the jacket space 8 at the upper and lower portions thereof respectively. The nipples are preferably secured to one end of the device as illustrated in the drawings. When the oven is used as a portable device, to be placed upon a stove or other place for heating, a filling tube or funnel 13 is secured to the nipple 11 and a faucet 14 to the nipple 12. The jacket space may be readily filled by pouring water in the funnel tube 13, and when it is desired to draw off the hot water the faucet may be utilized for this purpose.

The door 2 may be of any suitable construction, but I prefer to have the same formed with a water space connected with the water jacket 8 in order to maintain a uniform heat in the oven, and I have illustrated a door of this construction in the drawings. As shown therein the door is formed of inner and outer walls 16 and 17 respectively forming a water space 18, and the door is so mounted that the hinge connection forms means of communication between the water space 18 and the jacket space 8. To this end collars 19 and 20 are secured in the end walls 21 of the oven door and the adjacent wall 9 respectively and a tubular hinge pin 22 is arranged through said collars as shown clearly in Figs. 3 and 4. A head 23 is formed upon one end of the tubular hinge pin and a nut 24 is threaded upon the opposite end. Washers 25 are interposed between the head 23 and nut 24 and the adjacent collars to prevent leakage of water about the hinge. The upper outer edge of the door is well rounded as at 26 to permit of free opening of the door and a flange 27 is formed on the inner upper edge to close the joint between the upper edge of the door and the adjacent wall of the oven when the door is closed. The forward edge of the bottom 4 is rabbeted as at 28 to form a stop to limit the inner movement of the door as shown clearly in Fig. 5.

Having described my invention what I claim as new and desire to secure by Letters Patent is:—

An oven comprising a chamber open upon one side, the remaining walls of said chamber being water jacketed, a door for the open side of said chamber formed of parallel walls constituting a water space, collars secured in the end walls of said door, and similar collars provided in the adjacent oven walls, tubular hinge pins arranged in said collars and each provided at one end with a flanged head and a nut threaded on the other end, substantially as described.

In testimony whereof I have signed my name to this specification in the presence of two subscribing witnesses.

GEORGE EDWARD MAY.

Witnesses:
 GEO. D. ORMSBEE,
 O. H. SMITH.